United States Patent
Foreman

(10) Patent No.: US 11,603,240 B2
(45) Date of Patent: Mar. 14, 2023

(54) STRAP SYSTEM FOR SECURING A PAYLOAD

(71) Applicant: Stephen Mitchell Foreman, Huntington, TX (US)

(72) Inventor: Stephen Mitchell Foreman, Huntington, TX (US)

(*) Notice: Subject to any disclaimer, the term of this patent is extended or adjusted under 35 U.S.C. 154(b) by 0 days.

(21) Appl. No.: 17/575,391

(22) Filed: Jan. 13, 2022

(65) Prior Publication Data

US 2022/0135299 A1 May 5, 2022

Related U.S. Application Data

(60) Division of application No. 16/884,004, filed on May 26, 2020, now Pat. No. 11,254,480, which is a continuation-in-part of application No. 16/052,223, filed on Aug. 1, 2018, now abandoned.

(51) Int. Cl.
*A44B 18/00* (2006.01)
*B65D 63/10* (2006.01)

(52) U.S. Cl.
CPC ....... *B65D 63/1018* (2013.01); *B65D 63/109* (2013.01); *B65D 2313/02* (2013.01); *B65D 2563/107* (2013.01); *Y10T 24/2708* (2015.01); *Y10T 24/4736* (2015.01)

(58) Field of Classification Search
CPC ............. Y10T 24/4755; Y10T 24/4736; Y10T 24/4727; Y10T 24/47; Y10T 24/3916; Y10T 24/392; Y10T 24/1931; Y10T 24/4014; Y10T 24/4091; Y10T 24/4088; Y10T 24/4047; Y10T 24/27; Y10T 24/2708; Y10T 24/1402; Y10T 24/1406; Y10T 24/14; Y10T 24/141; Y10T 24/1498; B65D 2313/02
See application file for complete search history.

(56) References Cited

U.S. PATENT DOCUMENTS

| | | |
|---|---|---|
| 274,672 A | 3/1883 | Thomson |
| 473,094 A | 4/1892 | Stahley |
| 476,673 A | 6/1892 | Nelson et al. |
| 663,877 A | 12/1900 | Friedenberg |
| 685,252 A | 10/1901 | Bugbee |
| 823,258 A | 6/1906 | Burton et al. |
| 835,752 A | 11/1906 | Edward |
| 950,992 A | 3/1910 | Brown |
| 1,274,030 A | 7/1918 | Graham |
| 3,542,041 A | 11/1970 | Mercorella |
| 4,149,540 A | 4/1979 | Hasslinger |
| 4,273,130 A | 6/1981 | Simpson |

(Continued)

OTHER PUBLICATIONS

Office Action dated Sep. 24, 2019 in U.S. Appl. No. 16/052,223, filed Aug. 1, 2018.

(Continued)

*Primary Examiner* — Robert Sandy
*Assistant Examiner* — Michael S Lee

(57) ABSTRACT

The present invention discloses a strap system for securing a payload. The strap system includes a first fastener having a connecting crosspiece, a reversing crosspiece, and a hanger capable of attaching to the payload, and all connected together on each side by lateral members. The strap system also includes a strap attached to the connecting crosspiece of the first fastener and capable of passing around the reversing crosspiece and tightening the strap around the payload.

6 Claims, 8 Drawing Sheets

(56) References Cited

U.S. PATENT DOCUMENTS

| | | | |
|---|---|---|---|
| 4,384,583 | A | 5/1983 | Speelman |
| 4,426,908 | A | 1/1984 | Ullmann |
| 4,694,541 | A | 9/1987 | Skyba |
| 4,963,410 | A | 10/1990 | Bryant |
| 5,308,101 | A | 5/1994 | Monty |
| 5,362,303 | A | 11/1994 | Jasen |
| 5,402,557 | A | 4/1995 | Dalen |
| 5,603,591 | A | 2/1997 | McLellan |
| 5,604,961 | A | 2/1997 | Cole |
| 5,623,750 | A | 4/1997 | Nasin |
| 5,738,259 | A | 4/1998 | Mien |
| 5,836,060 | A | 11/1998 | Profit |
| 5,873,328 | A | 2/1999 | Campbell |
| 6,014,794 | A | 1/2000 | Mc Coy |
| 9,050,922 | B1 | 6/2015 | Taylor |
| 9,242,590 | B2 | 1/2016 | Preston |
| 9,376,050 | B1 | 6/2016 | Gill |
| 10,259,375 | B2 | 4/2019 | Young |
| 2002/0138952 | A1 | 10/2002 | Chou |
| 2004/0050888 | A1 | 3/2004 | Warner |
| 2005/0050696 | A1 | 3/2005 | Essick |
| 2005/0199663 | A1 | 9/2005 | Heaton |
| 2006/0037178 | A1 | 2/2006 | Sulhoff |
| 2013/0192539 | A1 | 8/2013 | Woodruff |
| 2014/0150214 | A1 | 6/2014 | Preston |
| 2015/0305310 | A1 | 10/2015 | Roberdeaux |

OTHER PUBLICATIONS

Office Action dated Nov. 27, 2019 in U.S. Appl. No. 16/052,223, filed Aug. 1, 2018.
Office Action dated Apr. 23, 2021 in U.S. Appl. No. 16/884,004, filed May 26, 2020.

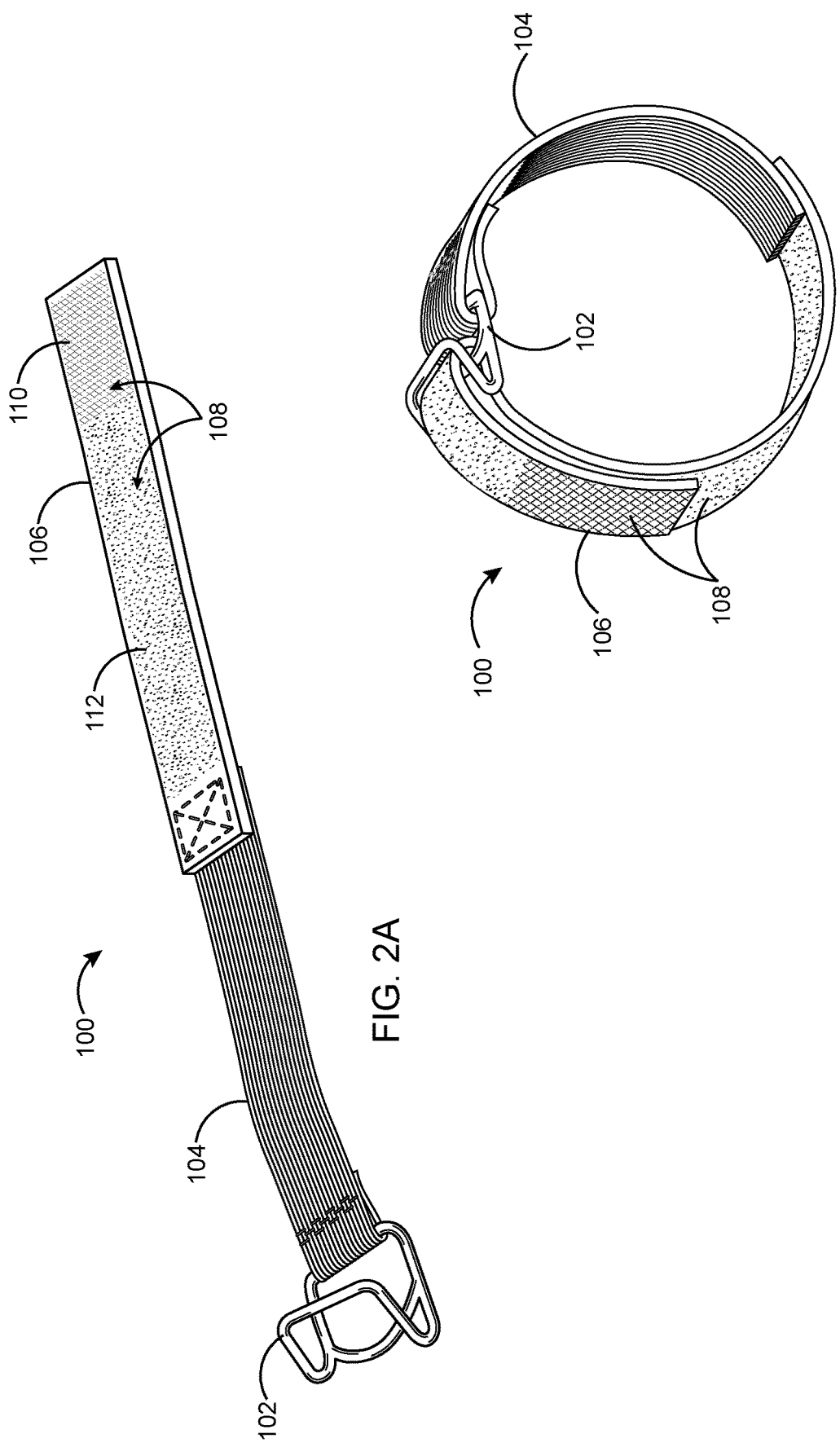

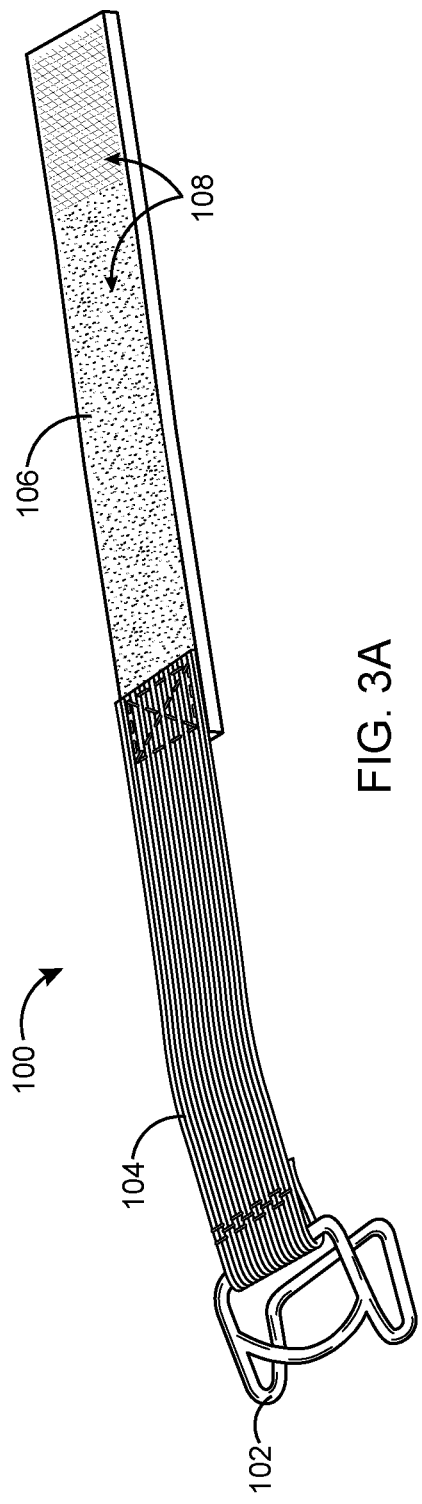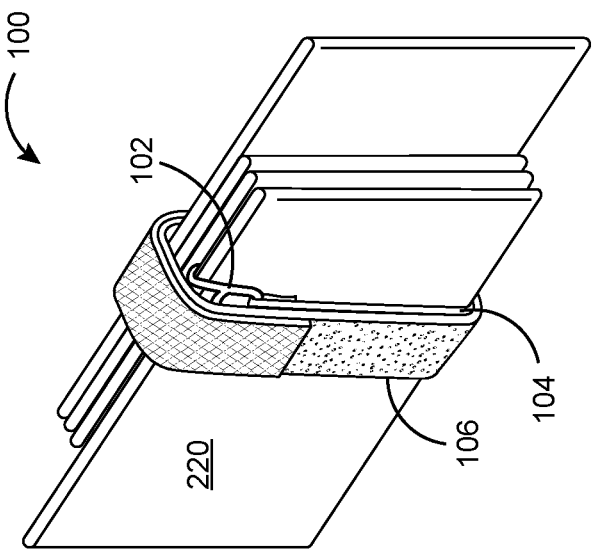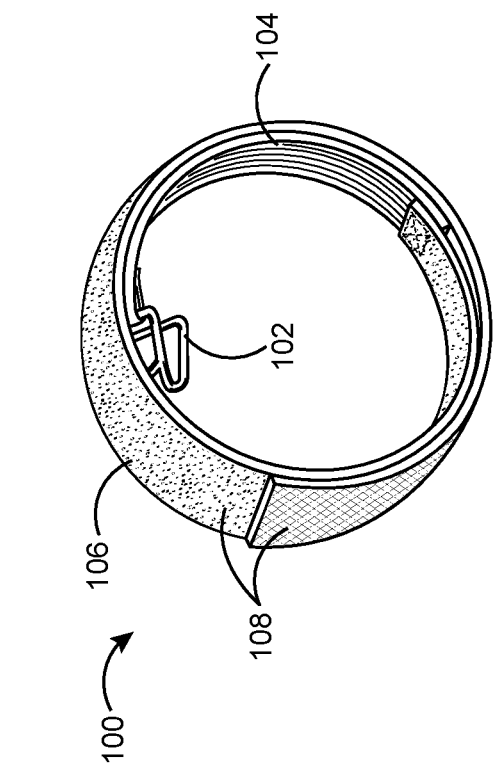
FIG. 3A
FIG. 3B
FIG. 3C

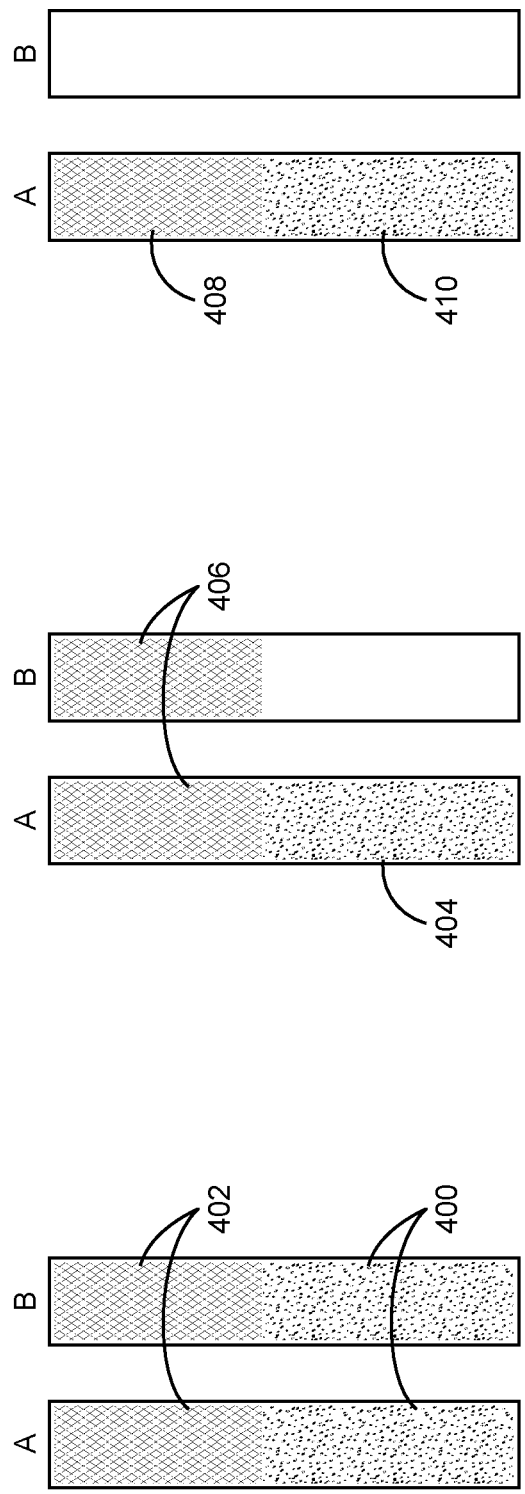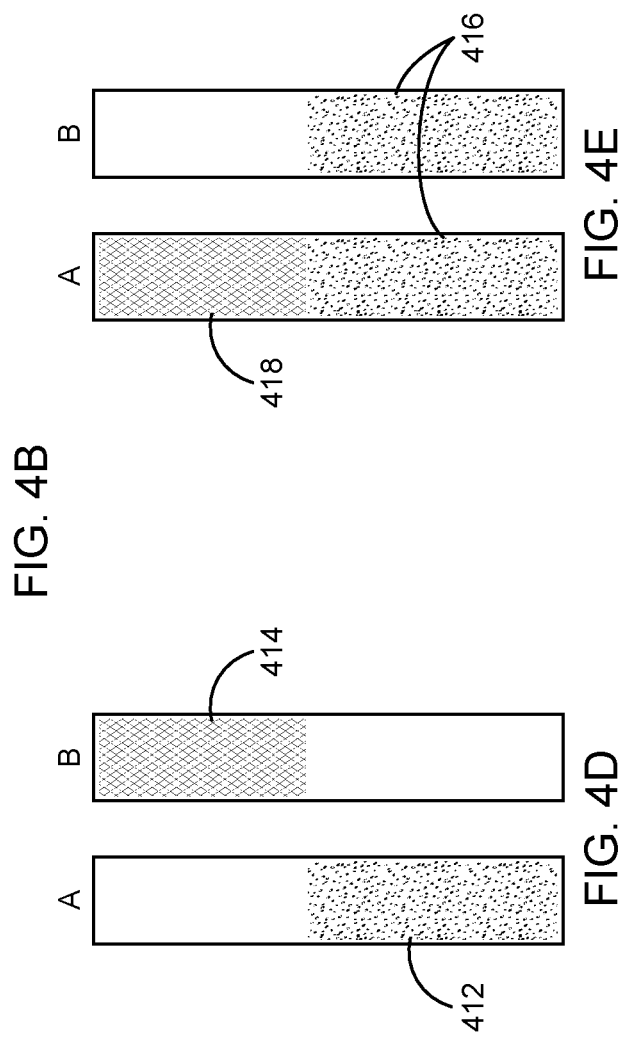

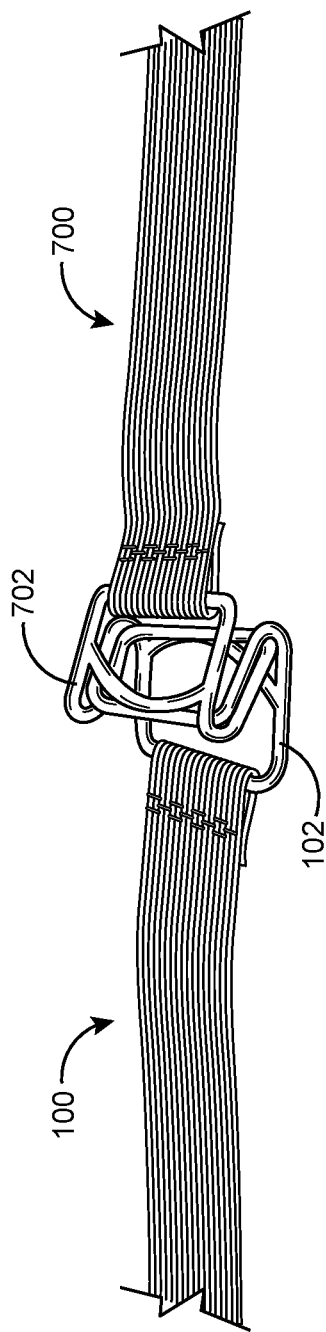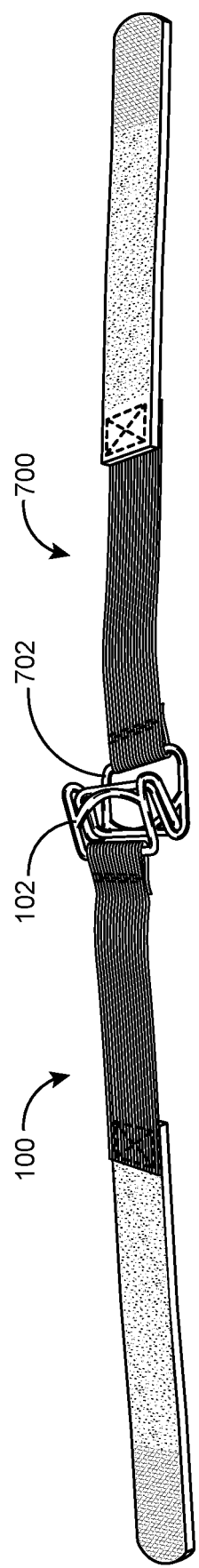

STRAP SYSTEM FOR SECURING A PAYLOAD

This application claims the benefit of, priority to, and is a divisional of Non-Provisional application Ser. No. 16/884,004 entitled "A Strap for Securing a Payload" and filed on May 26, 2020, which claims the benefit of, priority to, and is a continuation-in-part of Non-Provisional application Ser. No. 16/052,223 entitled "A Strap for Securing a Payload" and filed on Aug. 1, 2018, now abandoned, which are all incorporated herein by reference in their entirety for all purposes.

TECHNICAL FIELD

The present invention relates to the field of strap systems for securing a payload.

BACKGROUND ART

Not applicable.

SUMMARY OF INVENTION

The present invention discloses a strap system for securing a payload. A strap system according to embodiments of the present invention includes a first fastener having a connecting crosspiece, a reversing crosspiece, and a hanger capable of attaching to the payload. The connecting crosspiece, the reversing crosspiece, and the hanger are connected together on each side by lateral members. A strap system according to embodiments of the present invention also includes a strap attached to the connecting crosspiece of the first fastener and capable of passing around the reversing crosspiece and tightening the strap around the payload. The hanger useful in embodiments of the present invention may include two hook spurs and may further include a hook crosspiece connecting the distal ends of the two hook spurs.

A strap useful in embodiments of the present invention may include an elastic strap section connected to the connecting crosspiece of the first fastener at one end of the elastic strap section, an inelastic strap section connected to the elastic strap section at an opposite end of the elastic strap section as the first fastener, and a second fastener configured along the inelastic strap section to secure the inelastic strap section to the inelastic strap section when the strap is wrapped around the payload.

The second fastener useful in embodiments of the present invention may include a hook and loop fastener system. That hook and loop fastener system may include loops configured along both sides of the inelastic strap section at a closest region to the elastic strap section and hooks configured along both sides of the inelastic strap section at a farthest region from the elastic strap section. Alternatively, the hook and loop fastener system may include loops configured along one side of the inelastic strap section at a closest region to the elastic strap section and hooks configured along both sides of the inelastic strap section at a farthest region from the elastic strap section. In other embodiments, the hook and loop fastener system may include loops configured along one side of the inelastic strap section at a closest region to the elastic strap section and hooks configured along the one side of the inelastic strap section at a farthest region from the elastic strap section. In still further embodiments, the hook and loop fastener system may include loops configured along one side of the inelastic strap section at a closest region to the elastic strap section and hooks configured along an opposite side of the inelastic strap section at a farthest region from the elastic strap section. In other embodiments, the hook and loop fastener system may include loops configured along both sides of the inelastic strap section at a closest region to the elastic strap section and hooks configured along one side of the inelastic strap section at a farthest region from the elastic strap section.

Certain embodiments according to the present invention include methods of securing a payload. Such exemplary method embodiments include positioning a first fastener adjacent to the payload. The first fastener in such methods includes a connecting crosspiece, a reversing crosspiece, and a hanger capable of attaching to the payload. In such exemplary methods, the connecting crosspiece, the reversing crosspiece, and the hanger are connected together on each side by lateral members. Positioning a first fastener adjacent to the payload may include hooking the hanger of the first fastener onto the payload. In other embodiment, however, the hanger may not be hooked to the payload.

Such exemplary method embodiments also include wrapping a strap around the payload. The strap in such exemplary methods are attached to the connecting crosspiece of the first fastener and include an elastic strap section connected to the connecting crosspiece of the first fastener at one end of the elastic strap section and an inelastic strap section connected to the elastic strap section at an opposite end of the elastic strap section as the first fastener.

Such exemplary method embodiments include cinching the elastic strap section of the strap around the payload and wrapping the inelastic strap section of the strap around the elastic region. Wrapping the inelastic strap section of the strap around the elastic region according to embodiments of the present invention may include wrapping the strap around the payload in an initial direction, passing the strap between the connecting crosspiece and the reversing crosspiece of the first fastener, and pulling on the strap in a direction opposite of the initial direction to tighten the strap around the payload. Alternatively, wrapping the inelastic strap section of the strap around the elastic region according to embodiments of the present invention may include wrapping the strap around the payload in an initial direction, passing the strap over the first fastener, and pulling on the strap in the initial direction to tighten the strap around the payload.

Such exemplary method embodiments also include fastening a first portion of the inelastic strap section of the strap to a second portion of the inelastic strap section to secure the strap in place around the payload. Fastening a first portion of the inelastic strap section of the strap to a second portion of the inelastic strap section according to embodiments of the present invention may include fastening the first portion to the second portion on a same side of the strap. Alternatively, fastening a first portion of the inelastic strap section of the strap to a second portion of the inelastic strap section according to embodiments of the present invention may include fastening the first portion to the second portion on opposite sides of the strap.

BRIEF DESCRIPTION OF DRAWINGS

The accompanying drawings, which are incorporated in and constitute a part of this specification, illustrate an implementation of apparatus consistent with the present invention and, together with the detailed description, serve to explain advantages and principles consistent with the invention. In the drawings, FIG. 1 sets forth line drawings illustrating a perspective view of an exemplary first fastener used in an exemplary strap system for securing a payload according to embodiments of the present invention.

FIGS. 2A-D set forth line drawings illustrating perspective views of an exemplary strap system for securing a payload according to embodiments of the present invention.

FIGS. 3A-C set forth line drawings illustrating perspective views of an exemplary strap system for securing a payload according to embodiments of the present invention.

FIGS. 4A-E set forth line drawings illustrating top view of both sides of an exemplary inelastic strap section used in an exemplary strap system for securing a payload according to embodiments of the present invention.

FIGS. 7A-B set forth line drawings illustrating perspective views of an exemplary strap system for securing a payload according to embodiments of the present invention.

DESCRIPTION OF EMBODIMENTS

Figure 1:
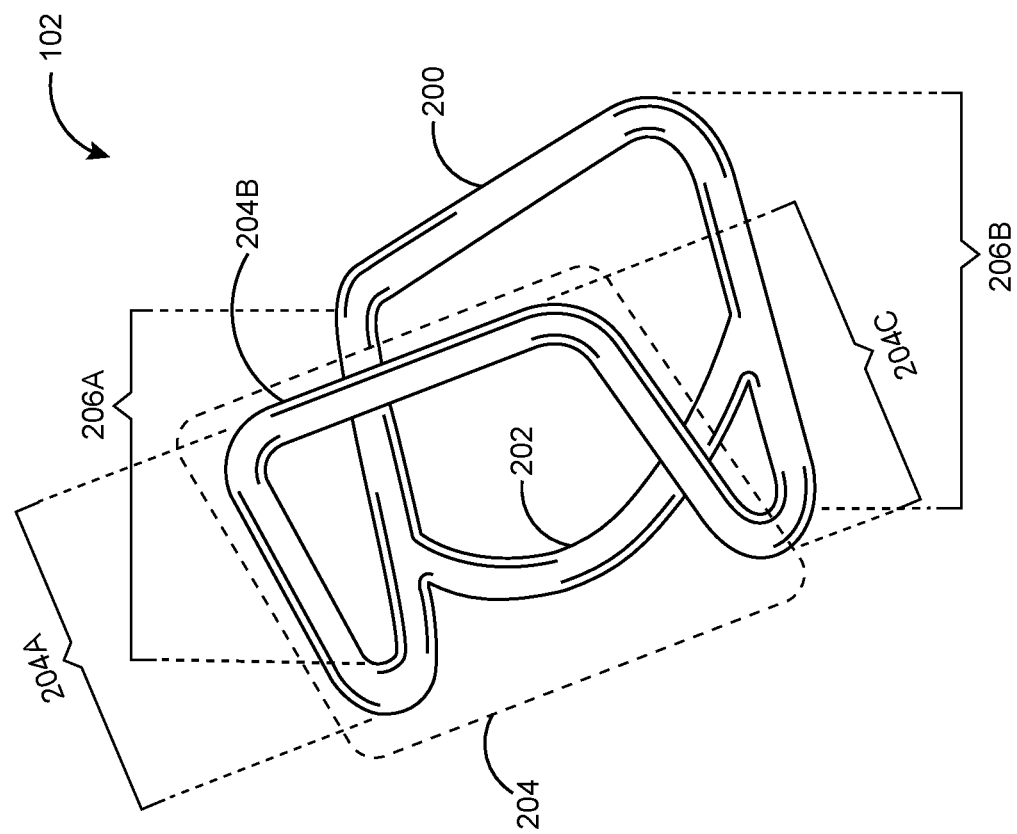

Exemplary embodiments of a strap system for securing a payload are described herein with reference to the accompanying drawings, beginning with FIG. 1. FIG. 1 sets forth line drawings illustrating a perspective view of an exemplary first fastener (102) used in an exemplary strap system for securing a payload according to embodiments of the present invention. A payload may include any item that needs to be secured for use, storage and/or transport. Exemplary straps systems according to embodiments of the present invention may be used to secure a variety of payloads including, for example, bulky items to racks, equipment items on a trailer, cargo on a vehicle. Some payloads that need to be secured may not need to be secured to another item such as a vehicle, trailer, or rack, but rather need to be secured to itself. For example, current prior art straps used to secure certain items to vehicles often have excess length that flaps around in the wind like a long ribbon. Exemplary straps systems according to embodiments of the present invention may be used to secure a payload in the form of the excess length of another strap that is used to secure an item in a vehicle. In this way, exemplary straps systems according to embodiments of the present invention advantageously help keep the excess length of other current prior art straps secured to themselves so that they do not flap around in the wind or are otherwise exposed needlessly to the whims of the environment.

The exemplary first fastener (102) of FIG. 1 includes a connecting crosspiece (200). In FIG. 1, the connecting crosspiece (200) is a section of the first fastener (102) where a strap is connected to the first fastener (102). A strap according to embodiments of the present invention is a structure having a length substantially longer than its width that is flexible and used to fasten or secure something such as a payload. Such a strap may be made, for example, out of cloth, fabric, leather, nylon, rubber, a combination thereof, or other materials as will occur to those of skill in the art. Examples of straps may include ropes, substantially flat strips of material, cords, strings, or combinations thereof. Such straps may be connected to the first fastener (102) at the connecting crosspiece (200) in FIG. 1 by wrapping such a strap around the connecting crosspiece (200) and fastening the strap back to itself using stitching, glue, brads, rivets, knots, or other mechanisms depending on the material composition of the strap as will occur to those of skill in the art. The term 'crosspiece' is used to describe the connecting crosspiece because that component spans the width of the fastener (102) in FIG. 1.

The exemplary connecting crosspiece (200) of FIG. 1 is depicted as a circular metal stock for example only and not for limitation. Other connecting crosspieces useful to exemplary embodiments of the present invention may include a slotted connecting crosspiece. Such a slot may allow the strap to pass through such an exemplary connecting crosspiece and be held in place by the pressure applied to the strap in or around the slot, which may have a movable component such as a plate that is tightened onto the strap by turning a screw or actuator.

The exemplary first fastener (102) of FIG. 1 includes a reversing crosspiece (202). The reversing crosspiece (202) of FIG. 1 is a section of the first fastener (102) used to reverse the wrapping direction of the strap around a payload. For example, the strap attached at the connecting crosspiece (200) of FIG. 1 could wrap around a payload beneath the fastener (102) which would extend the strap in the direction to the right of FIG. 1. Then, the strap would continue to wrap around the payload and approach the fastener (102) of FIG. 1 from the left side of FIG. 1. The strap would be threaded around the reversing crosspiece (202) of FIG. 1 between the reversing crosspiece (202) and the connecting crosspiece (200) and then pulled back toward the left side of FIG. 1, thereby reversing the wrapping direction. Examples of reversing the wrapping direction of a strap using the reversing crosspiece (202) of FIG. 1 are shown with respect to FIGS. 2A-C. The reversing crosspiece (202) of FIG. 1 is depicted with an arc—this is for example only and not for limitation. Other examples of a reversing crosspiece useful in embodiments of the present invention may include a straight reversing crosspiece. Other examples of a reversing crosspiece useful in embodiments of the present invention may include one or more small rolling cylindrical collars around the main shaft of a reversing crosspiece to reduce the friction of a strap as it is pulled around the reversing crosspiece.

The exemplary first fastener (102) of FIG. 1 also includes hanger (204) capable of attaching to a payload by hooking on the payload. The exemplary hanger (204) of FIG. 1 is formed from two hook spurs (204A and 204C) and a hook crosspiece (204B) connecting the distal ends of the two hook spurs (204A and 204C). The hook spurs (204A and 204C) of FIG. 1 are projection members angled with respect to the rest of the fastener (102) back across the body of the fastener (102) to form a claw capable of hooking onto a payload. The hook crosspiece (204B) of FIG. 1 adds to the strength and stability of the hook spurs (204A and 204C) form the hanger (204). The hanger (204) of FIG. 1 is exemplary in nature and other hangers useful in the present invention may only have the hook spurs—or only one hook spur—without having an additional hook crosspiece. An example of hooking the hanger (204) of FIG. 1 on a payload is shown with respect to FIG. 3C.

In the example of FIG. 1, the connecting crosspiece (200), the reversing crosspiece (202), and the hanger (204) are connected together on each side by lateral members (206A and 206B). These lateral members (206A and 206B) of FIG. 1 form and are the frame that hold the connecting crosspiece (200), the reversing crosspiece (202), and the hanger (204) in their respective positions. In FIG. 1, each side of the connecting crosspiece (200), the reversing crosspiece (202), and the hanger (204) are connected to these lateral members (206A and 206B).

The components of the exemplary fastener (102) in FIG. 1—that is the connecting crosspiece (200), the reversing crosspiece (202), the hanger (204), and the lateral members (206A and 206B)—are all formed from the same circular metal stock. This is of course for example and not for limitation. The various components of an exemplary first fastener useful in embodiments of the present invention do not have to made out of metal or even the same materials. For example, the fastener (102) of FIG. 1 could have been made out of plastics or a combination of plastics and metal that may have employed a variety of geometric cross sections such as, a square, a rectangle, a oval, a triangle, or other shape.

Turning to FIGS. 2A-D, FIGS. 2A-C depict the interaction of various components of the fastener (102) from FIG. 1 with an exemplary strap according to embodiments of the present invention. Accordingly, FIGS. 2A-D set forth a line drawing illustrating a perspective view of an exemplary strap system for securing a payload according to embodiments of the present invention.

Figure 2D:
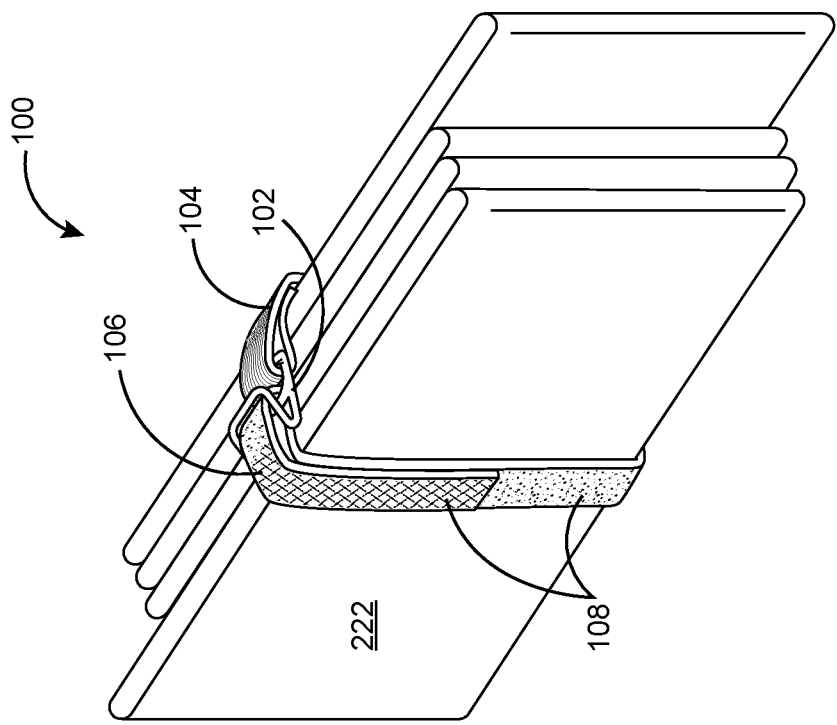
Figure 2C:
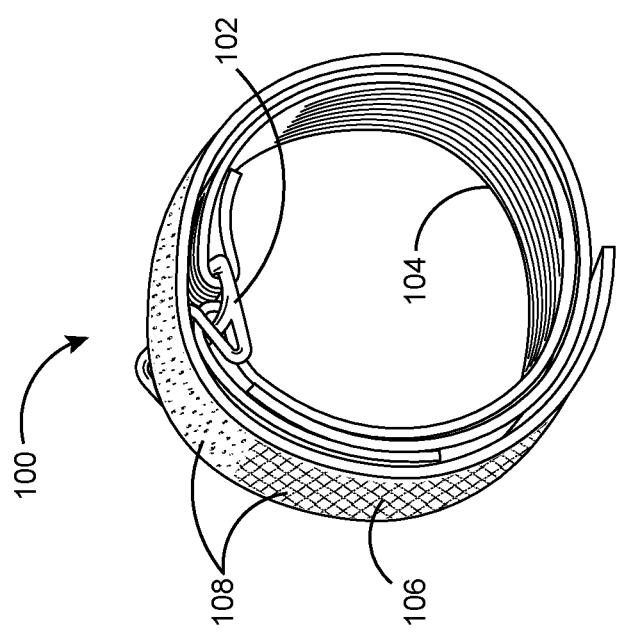

In the example of FIGS. 2A-D, the strap system includes the first fastener (102) from FIG. 1. A fastener is any of a variety of devices for holding together two objects or parts sometimes required to be separate. Fasteners capable of being adapted for use in present embodiments of the invention may include loops, rings, snaps, hooks and eyes, hooks alone, hook and loop fasteners such as Velcro®, and so on. In the example of FIGS. 1A-C, the first fastener (102) has a connecting crosspiece (200 on FIG. 1) to which the strap (100) of FIGS. 2A-C is attached. The fastener (102) of FIG. 1 is designed so that the strap can pass through the fastener (102) and around the reversing crosspiece (202 on FIG. 1) and subsequently reverse the wrapping direction. When pulled in the reverse direction, the strap (100) of FIGS. 2A-C cinches around the payload.

The exemplary strap (100) of FIGS. 2A-D includes an elastic strap section (104) connected to the connecting crosspiece (200 on FIG. 1) of the first fastener (102) at one end of the elastic strap section (104). The elastic strap section (104) of FIGS. 2A-C is a portion of the strap (100) that stretches to keep force against the payload so as to increase the security afforded by the strap (100) for the particular payload being secured. By having this particular elastic strap section (104) in the exemplary strap (100) of FIGS. 2A-C, the payload's security will be enhanced because there will be a constant tension on the payload provided by the elastic nature of the elastic strap section (104). The elastic strap section (104) of FIGS. 2A-C may be implemented using bungee cord, rubber, stretchable silicone, elastic polymers, and any other stretchable material as will occur to those of skill in the art.

The elastic strap section (104) of FIGS. 2A-D is connected to the first fastener (102) by stitching the elastic strap section (104) around the connecting crosspiece (200 on FIG. 1) of the fastener (102). Of course, this type of connection is for example only and not for limitation. An elastic strap section may connect to the first fastener in exemplary embodiments of the present invention in a variety of ways such as a tension connecter, clasps, clips, and any other mechanism as will occur to those of skill in the art.

In the example of FIGS. 2A-D, the exemplary strap (100) includes an inelastic strap section (106) connected to the elastic strap section (104) at an opposite end of the elastic strap section (104) as the first fastener (102). The inelastic strap section (106) of FIGS. 2A-C is a flexible portion of the strap (100) that resists stretching to provide a stable platform for the inelastic strap section (106) to attach to itself. The inelastic strap section (106) of FIGS. 2A-C may be implemented using nylon, leather, inelastic polymers, and any other flexible, inelastic material as will occur to those of skill in the art. The ratio of the length of the elastic strap section (104) to the length of the inelastic strap section (106) in exemplary embodiments of the present invention may vary based on a variety of factors. Such factors may include the size of the payload being secured by the strap system (100) of FIG. 2A. Sizing the length of the elastic strap section (104) in FIG. 2A such that the elastic strap section (104) may be stretched around most of the payload facilitates cinching the strap around the payload. While sizing the length of the inelastic strap section (106) in FIG. 2A such that the inelastic strap section (106) may be wrapped around the payload or having enough of the inelastic strap section (106) to reverse back through the fastener (102) and attach back to itself facilitates securing the payload. Other factors as will occur to those of skill in the art may also assist in determining the optimal ration between the elastic strap section (104) and the inelastic strap section (106).

The exemplary strap (100) of FIGS. 2A-D also includes a second fastener (108) configured along the inelastic strap section (106) to secure the inelastic strap section (106) to the inelastic strap section (106) when the strap (100) is wrapped around the payload. The second fastener (108) of FIGS. 2A-C is implemented as a hook and loop fastener system that has hooks (110) configured along both sides of the inelastic strap section (106) at a farthest region from the elastic strap section (104) and loops (112) configured along both sides of the inelastic strap section (106) at a closest region to the elastic strap section (104). The ratio between hooks and loops in exemplary embodiments of the present invention may vary based on application such as the ideal size of the payload for use the with any particular exemplary strap system, the ratio between the lengths of the elastic strap section to the inelastic strap section, the force applied on the strap system by the payload as the payload resists being bound by the strap system, and other factors as will occur to those of skill in the art.

Implementing the second fastener (108) with the hooks (110) and loops (112) on the same side of the inelastic strap section (106) as shown in FIGS. 2A-C allows the strap (100) to pass through the first fastener (102) and fold back on itself so that the hooks (110) mesh with the loops (112)—thereby securing the inelastic strap section (106) to itself as shown in FIGS. 2B and 2D. In the example of FIG. 2D, the elastic strap section (104) is stretched around the payload (222) and the inelastic strap section (106) is looped around the reversing crosspiece (202 on FIG. 1) of the fastener (102). In this way, the fastener (102) allows the inelastic strap section (106) to fold back on itself and be secured on the same side of the inelastic strap section (106) using fastener (108). The payload (222) of FIG. 2D is the excess straps from a ratchet strap system, but this is for example and not for limitation.

As mentioned above, the hooks (110) and loops (112) of FIGS. 2A-C are configured along both sides of the inelastic strap section (106). Having the hooks (110) and loops (112) on opposite sides allows the as in FIGS. 2A-C allows the inelastic strap section (106) to be secured to itself when the inelastic strap section (106) wraps around in such a way as to form the entire outer circumference of the strap (100) as shown in FIG. 2C.

Turning now to further exemplary embodiments of the present invention, FIGS. 3A-C set forth line drawings illustrating a perspective view of the exemplary strap system of FIGS. 2A-C for securing a payload according to embodiments of the present invention but turned over on its other side—that is, the hanger (204 on FIG. 1) is turned toward the payload. As mentioned, the strap system of FIGS. 3A-C includes the first fastener (102) with the hanger (204 on FIG. 1) turned toward the payload. This allows the strap (100) of FIGS. 3A-C to easily hook onto payload (220), which in this example, is implemented as the excess length of another tie-down strap. Although, those of skill in the art will recognize that the payload could be a variety of other types of payloads.

In the example of FIGS. 3A-C, the strap (100) includes the elastic strap section (104) connected to the first fastener (102) at one end of the elastic strap section (104). The strap (100) of FIGS. 3A-C also includes an inelastic strap section (106) connected to the elastic strap section (104) at an opposite end of the elastic strap section (104) as the first fastener (102).

The strap (100) of FIGS. 3A-C includes the second fastener (108) configured along the inelastic strap section (106) to secure the inelastic strap section (106) to the inelastic strap section (106). As mentioned before, the second fastener (108) of FIGS. 3A-C is implemented with hooks and loops configured on both sides of the inelastic strap section (106). Having hooks and loops configured on the opposite sides of the inelastic strap section (106) allows the inelastic strap section (106) to connect to itself without utilizing the reversing crosspiece (202 on FIG. 1) to make the inelastic strap section (106) fold back on itself because the reversing crosspiece (202 on FIG. 1) is not typically used when the hanger (204 on FIG. 1) is attached to a payload as shown in FIG. 3C. The strap (100) in the exemplary FIGS. 3A-C is just wrapped around and around the payload and secured with the hook and loop fastener (108) in this example. In this way, the strap (100) of FIGS. 3A-C typically does not fold back on itself to mesh the hooks with the loops. Rather, the hooks and loops of the second fastener (108) of FIGS. 3A-C mesh together when the inelastic strap section (106) completely forms the outer circumference of the strap (100) when wound around a payload.

In the example of FIG. 3C, the hanger of the first fastener (102) hooks to the excess strap length payload (220) thereby affixing the strap (100) to the payload (220). After the fastener (102) hooks to the payload (220) of FIG. 3C, an operator can pull the elastic strap section (104) which in turn stretches section (104) cinching the elastic region of the strap (100) around the payload (220). After the elastic strap section (104) is cinched around the payload (220) in the example of FIG. 3C, the operator can wrap the inelastic strap section (106) around the elastic region (104) to completely cover the elastic strap section (104) and fasten a first portion of the inelastic strap section (106) to a second portion of the inelastic region (106) to secure the strap (100) in place around the payload (220).

Those of skill in the art will appreciate the benefits of the strap system for securing a payload according to embodiments of the present invention—especially over any straps having two inelastic sections surrounding an elastic section. The advantage of straps according to embodiments of the present invention is that the first couple wraps of the strap around a payload operate to cinch the payload together and further secure it than would otherwise be available to an operator using a completely inelastic strap. Moreover, having the elastic portion of the strap closest to the payload is important because straps designed with an inelastic region closest to the payload could not gain the cinching benefits afforded by the straps for securing a payload according to embodiments of the present invention. Rather, straps designed with the inelastic region closest to the payload would be resisting the cinching affording by any elastic region that would be included in the strap.

In the examples above, having hooks and loops on both sides of the inelastic strap section of a strap system according to embodiments of the present invention provides the most flexibility for an operator. That is, the operator can utilize the reverse crosspiece of the fastener to connect the strap to itself on the same side of the strap (see FIG. 2B) or on opposite sides of the strap (see FIG. 2C) depending on the size of the payload. Readers will recognize that the size of the payload determines whether the inelastic strap section wraps around onto itself because the inelastic strap section forms the entire outer circumference of the payload. In addition, when the operator desires to utilize the hanger feature of the fastener such as in FIG. 3C, having the hooks and loops on opposites sides of the inelastic strap section allows the operator to connect the strap to itself on opposite sides of the strap.

Of course, having the hook and loop fastener system on both sides of the inelastic section is not the only configuration. Turning to FIGS. 4A-E, FIGS. 4A-E set forth line drawings illustrating top view of both sides of an exemplary inelastic strap section used in an exemplary strap system for securing a payload according to embodiments of the present invention. In FIGS. 4A-E, the bottom of the drawings is the end where the inelastic region connects with the elastic region of the straps useful in embodiments of the present invention. Each of FIGS. 4A-E depicts both sides of the inelastic strap—side A and side B.

FIG. 4A depicts a configuration of hooks and loops that is similar to that of FIGS. 2A-C and 3A-C. That is, loops (400) are configured along both sides of the inelastic strap section at a closest region to the elastic strap section, and hooks (402) are configured along both sides of the inelastic strap section at a farthest region from the elastic strap section.

FIG. 4B depicts a hook and loop fastener system whereby the loops (404) are exclusively configured along one side of the inelastic strap section at a closest region to the elastic strap section, and hooks (406) are configured along both sides of the inelastic strap section at a farthest region from the elastic strap section. Of course, FIG. 4A also shows the hooks on both sides and the loops on one side, but not exclusively so.

FIG. 4C depicts a hook and loop fastener system whereby loops (408) are exclusively configured along one side of the inelastic strap section at a closest region to the elastic strap section, and hooks (410) are exclusively configured along the same side of the inelastic strap section at a farthest region from the elastic strap section. Of course, FIGS. 4A, 4B, and 4D also show the hooks and loops configured on the same side, but not exclusively so.

FIG. 4D depicts a hook and loop fastener system whereby loops (412) are configured along one side of the inelastic strap section at a closest region to the elastic strap section, and hooks (414) are configured along an opposite side of the inelastic strap section at a farthest region from the elastic strap section. Of course, FIGS. 4A, 4B, and 4E also show the hooks and loops configured on opposite sides, but not exclusively so.

FIG. 4E depicts a hook and loop fastener system whereby loops (416) are configured along both sides of the inelastic strap section at a closest region to the elastic strap section, and hooks (418) are exclusively configured along one side of the inelastic strap section (106) at a farthest region from the elastic strap section (104). Of course, FIG. 4A also shows the loops on both sides and the hooks on one side, but not exclusively so.

Figure 5:
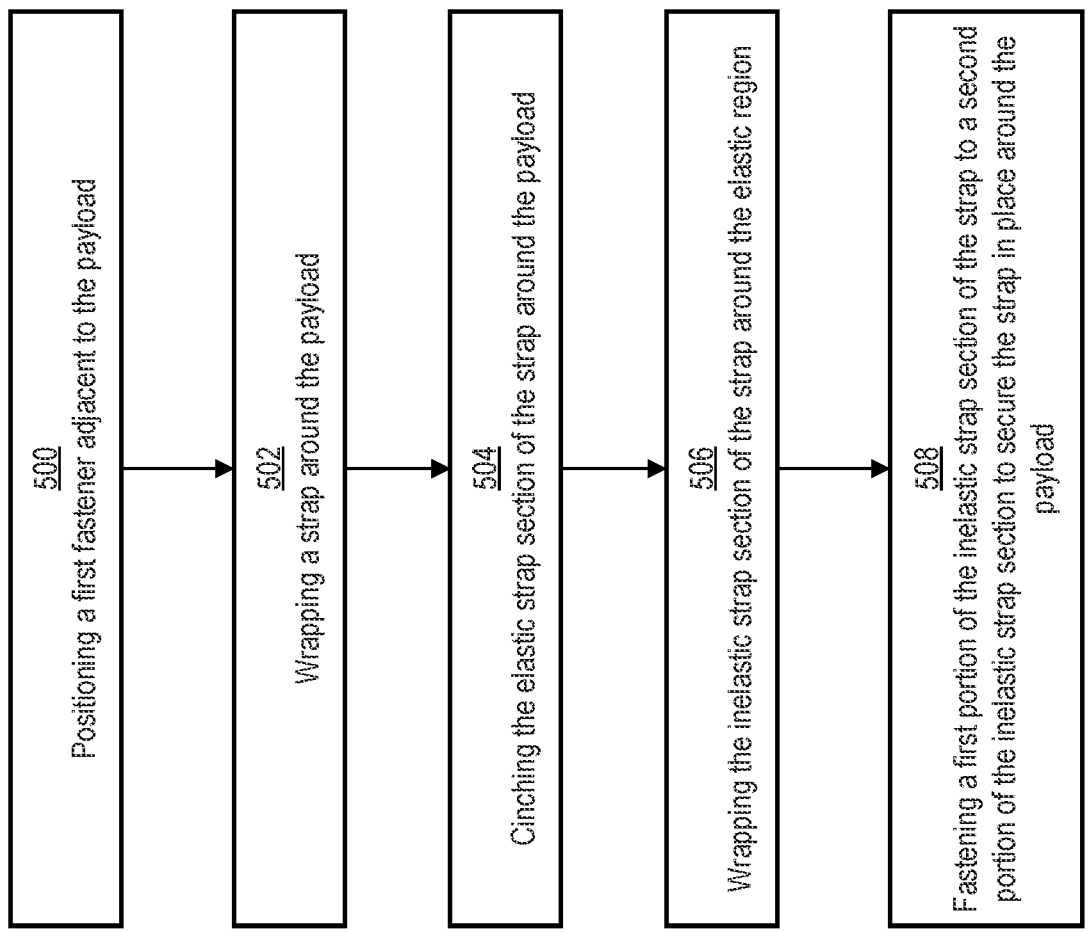
FIG. 5 sets forth a line drawing illustrating an exemplary method for securing a payload according to embodiments of the present invention.

Turning to FIG. 5, FIG. 5 sets forth a line drawing illustrating an exemplary method for securing a payload according to embodiments of the present invention. The method of securing a payload according to FIG. 5 includes positioning (500) a first fastener adjacent to the payload. The first fastener described in FIG. 5 includes a connecting crosspiece, a reversing crosspiece, and a hanger capable of attaching to the payload. The connecting crosspiece, the reversing crosspiece, and the hanger of FIG. 5 are connected together on each side by lateral members. Positioning (500) a first fastener adjacent to the payload according to the example of FIG. 5 may include hooking the hanger of the first fastener onto the payload. In some embodiments, however, the hanger is not hooked to the payload.

The method of securing a payload according to FIG. 5 also includes wrapping (502) a strap around the payload. The strap described in FIG. 5 is attached to the connecting crosspiece of the first fastener. The strap of FIG. 5 includes an elastic strap section connected to the connecting crosspiece of the first fastener at one end of the elastic strap section and an inelastic strap section connected to the elastic strap section at an opposite end of the elastic strap section as the first fastener.

According to FIG. 5, the method of securing a payload according to embodiments of the present invention also includes cinching (504) the elastic strap section of the strap around the payload.

The method of securing a payload according to FIG. 5 includes wrapping (506) the inelastic strap section of the strap around the elastic region. Wrapping (506) the inelastic strap section of the strap around the elastic region according to the method of FIG. 5 may include wrapping the strap around the payload in an initial direction, passing the strap between the connecting crosspiece and the reversing crosspiece of the first fastener, and pulling on the strap in a direction opposite of the initial direction to tighten the strap around the payload. In other embodiments, however, wrapping (506) the inelastic strap section of the strap around the elastic region according to the method of FIG. 5 may include wrapping the strap around the payload in an initial direction, passing the strap over the first fastener, and pulling on the strap in that same initial direction to tighten the strap around the payload.

According to FIG. 5, the method of securing a payload according to embodiments of the present invention also includes fastening (508) a first portion of the inelastic strap section of the strap to a second portion of the inelastic strap section to secure the strap in place around the payload.

Fastening (508) a first portion of the inelastic strap section of the strap to a second portion of the inelastic strap section according to the method of FIG. 5 may include fastening the first portion to the second portion on a same side of the strap. Alternatively, fastening (508) a first portion of the inelastic strap section of the strap to a second portion of the inelastic strap section according to the method of FIG. 5 may include fastening the first portion to the second portion on an opposite side of the strap.

Figure 6A:
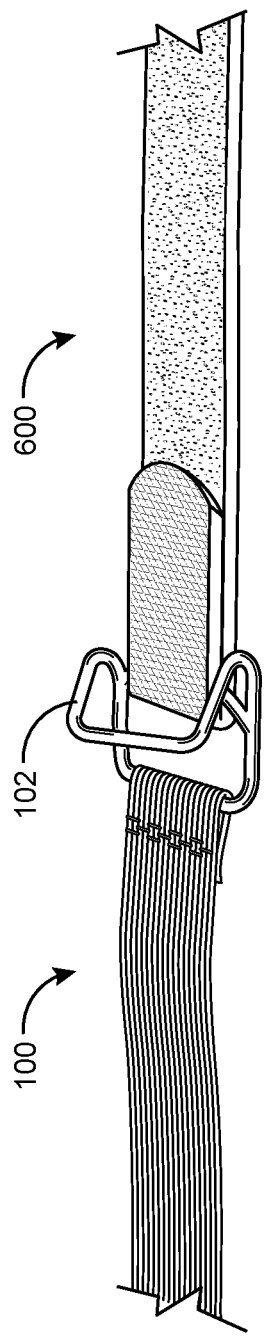
FIGS. 6A-B set forth line drawings illustrating perspective views of an exemplary strap system for securing a payload according to embodiments of the present invention.
Figure 6B:
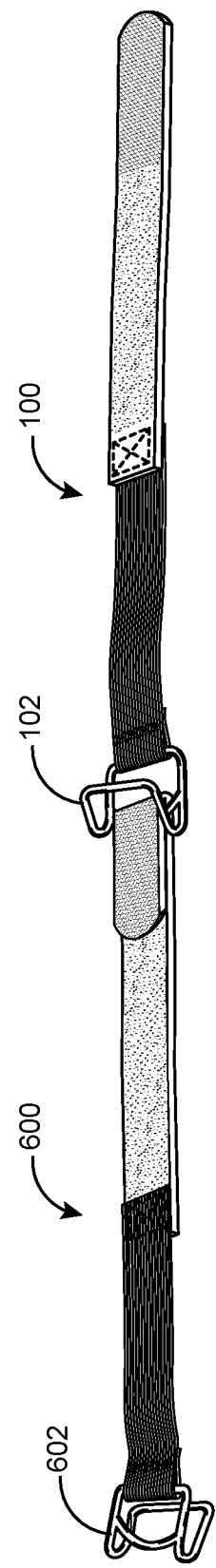

The exemplary strap systems described herein may be combined to form larger strap systems useful in embodiments of the present invention. For example, FIGS. 6A-B set forth line drawings illustrating perspective views of an exemplary strap system for securing a payload according to embodiments of the present invention that consists of multiple straps. In FIGS. 6A-B, the exemplary strap system includes the first fastener (102) and strap (100) described with reference to FIG. 1, FIGS. 2A-D, and FIGS. 3A-C, above. The exemplary strap system of FIGS. 6A-B also includes a third fastener (602 on FIG. 6B) having a same structure as the first fastener (102). The exemplary strap system of FIGS. 6A-B also includes a second strap (600) attached to the third fastener (602 on FIG. 6B) in the same manner as the strap (100) attaches to the first fastener (102). The second strap (600) of FIGS. 6A-B includes a hook and loop fastener system similar to that of the strap (100).

In FIGS. 6A-B, the second strap (600) attaches to the reversing crosspiece (202 on FIG. 1) of the first fastener (102) by passing through the fastener (102) around the reversing crosspiece (202 on FIG. 1) and by securing to itself using the hook and loop fastener system folding back onto the second strap (600) as shown in FIG. 6B. In FIG. 6B, the strap (100) is capable of attaching to the third fastener (602) after the strap (100) and second strap wrap (600) around the payload. The strap (100) of FIG. 6B may attach to the third fastener (602) in the same manner that the second strap (600) attaches to the first fastener (102).

The exemplary strap systems described herein may be combined in other ways to form larger strap systems useful in embodiments of the present invention. For example, FIGS. 7A-B set forth line drawings illustrating perspective views of an exemplary strap system for securing a payload according to embodiments of the present invention that consists of multiple straps. In FIGS. 7A-B, the exemplary strap system includes the first fastener (102) and strap (100) described with reference to FIGS. 1, FIGS. 2A-D, and FIGS. 3A-C, above. The exemplary strap system of FIGS. 7A-B also includes a third fastener (702 on FIG. 7B) having a same structure as the first fastener (102). The exemplary strap system of FIGS. 7A-B also includes a second strap (700) attached to the third fastener (702 on FIG. 7B) in the same manner as the strap (100) attaches to the first fastener (102). The second strap (700) of FIGS. 7A-B includes a hook and loop fastener system similar to that of the strap (100).

In FIGS. 7A-B, the first fastener (102) connects to the third fastener (702) by interlocking the hangers of the first fastener (102) and the third fastener (702). Those of skill in the art will appreciate that the hanger with a hook crosspiece that is smaller in width than the gap between the lateral members at the reserving crosspiece will facilitate the interlocking of the fasteners (102 and 702) and make such a connection more likely to remain in place when tension is placed on the strap system because the tip of the hangers will set more deeply inside the opposite fastener. In FIG. 7B, the strap (100) is capable of attaching to the second strap (700) after the strap (100) and second strap (700) wrap around the payload. The straps (100 and 700) may attached to one another using the hook and loop fastener systems on each strap (100 and 700) by interlocking the hooks on one strap (100) and the loops on the other strap (700), or vice versa.

Readers will recognize the inherent advantages and uses of the various embodiments of the present invention. As previously mentioned, embodiments of the present invention may be used to secure extra unused lengths of ratchet straps while in those rachet straps are used in transport. Embodiments of the present invention allow for the neat storage of rachet straps and eliminate tangles because the exemplary strap system of the present invention securing cinches those loose ends together in a fashion that prevents them from become unwound and entangled. Similarly, embodiments of the present invention may be used to bundle and secure other loose materials such as, for example, extension cords or other elongated flexible materials or structures. Embodiments of the present invention may similarly be used to secure loose materials to fixed objects.

Because of the unique fastener, having a reversing crosspiece and hanger, coupled with the elastic and inelastic sections of the strap, and the fasteners built into both sides of the inelastic section, embodiments of the present invention provide an operator with versatility and ease of use. Such embodiments provide a simple solution for handling the tag end of ratchet straps to ensure strap is secure while in transport and provide gripping strength of the unified materials working together to secure whatever the strap system may be wrapped around. This provides an inherent grab and hold result that is useful across all industry segments, especially industrial and consumer goods.

While certain exemplary embodiments have been described in details and shown in the accompanying drawings, it is to be understood that such embodiments are merely illustrative of and not devised without departing from the basic scope thereof, which is determined by the claims that follow.

I claim:

1. A method of securing a payload comprising:
    positioning a first fastener adjacent to the payload, wherein the first fastener comprises a connecting crosspiece, a reversing crosspiece, and a hanger capable of attaching to the payload, wherein the connecting crosspiece, the reversing crosspiece, and the hanger are connected together on each side by lateral members;
    wrapping a strap around the payload, wherein the strap is attached to the connecting crosspiece of the first fastener, wherein the strap comprises an elastic strap section connected to the connecting crosspiece of the first fastener at one end of the elastic strap section, wherein the strap comprises an inelastic strap section connected to the elastic strap section at an opposite end of the elastic strap section as the first fastener;
    cinching the elastic strap section of the strap around the payload;
    wrapping the inelastic strap section of the strap around the elastic region; and
    fastening a first portion of the inelastic strap section of the strap to a second portion of the inelastic strap section to secure the strap in place around the payload.

2. The method of claim 1 wherein wrapping a strap around the payload further comprises:
    wrapping the strap around the payload in an initial direction;
    passing the strap between the connecting crosspiece and the reversing crosspiece of the first fastener; and
    pulling on the strap in a direction opposite of the initial direction to tighten the strap around the payload.

3. The method of claim 1 wherein wrapping a strap around the payload further comprises:
    wrapping the strap around the payload in an initial direction;
    passing the strap over the first fastener; and
    pulling on the strap in the initial direction to tighten the strap around the payload.

4. The method of claim 1 wherein positioning a first fastener adjacent to the payload further comprises hooking the hanger of the first fastener onto the payload.

5. The method of claim 1 wherein fastening a first portion of the inelastic strap section of the strap to a second portion of the inelastic strap section to secure the strap in place around the payload further comprises fastening the first portion to the second portion on a same side of the strap.

6. The method of claim 1 wherein fastening a first portion of the inelastic strap section of the strap to a second portion of the inelastic strap section to secure the strap in place around the payload further comprises fastening the first portion to the second portion on an opposite side of the strap.

* * * * *